United States Patent [19]

Rogols et al.

[11] 4,139,505

[45] Feb. 13, 1979

[54] ENLARGED GRANULE STARCH STILT MATERIAL FOR MICROENCAPSULATED COATINGS

[75] Inventors: Saul Rogols, Circleville; John W. Salter, Westerville, both of Ohio

[73] Assignee: General Mills Chemicals, Inc., Minneapolis, Minn.

[21] Appl. No.: 848,545

[22] Filed: Nov. 4, 1977

Related U.S. Application Data

[63] Continuation of Ser. No. 712,982, Aug. 9, 1976, abandoned.

[51] Int. Cl.$^2$ .............................................. C08L 1/00
[52] U.S. Cl. ........................................ 260/9; 536/47; 536/105; 536/109; 536/111
[58] Field of Search .................. 536/105, 111, 109, 47; 260/9

[56] References Cited

U.S. PATENT DOCUMENTS

| | | | |
|---|---|---|---|
| 3,876,629 | 4/1975 | Lotzgesell | 536/106 |
| 3,901,725 | 8/1975 | Bond et al. | 127/32 |

*Primary Examiner*—Melvyn I. Marquis
*Attorney, Agent, or Firm*—Patrick J. Span; Elizabeth Tweedy; Forrest L. Collins

[57] ABSTRACT

Enlarged granule starch useful as a protective stilt material in microencapsulated coatings to prevent premature rupture of the microcapsules. Starch granules are increased in size by alkali-swelling of the granules in aqueous slurry. The enlarged granules are then crosslinked to aid in preserving the enlarged granular form through subsequent aqueous coating applications and thermal drying steps. A combination of hydrocyclone starch granule sizing and granule treatment employing alkali-swelling and crosslinking substantially improves the yield of usable large granule stilt materials obtainable from prime grade wheat starch, and other bimodal granular starches such as barley and rye.

28 Claims, 6 Drawing Figures

ENLARGED GRANULE STARCH STILT MATERIAL FOR MICROENCAPSULATED COATINGS

This application is a continuation of U.S. Patent Application Ser. No. 712,982, entitled Enlarged Granule Starch Stilt Material For Microencpasulated Coatings, filed Aug. 9, 1976 by Saul Rogols et al and now abandoned.

BACKGROUND

Microencapsulated coatings offer many advantages. For example, "carbonless" copy paper employs chromogenic ink capsules coated on the copy paper which rupture under typewriter or similar impact pressure to release the marking material to make a copy without the necessity of carbon paper. Such coatings usually employ "stilt" materials, or protective materials in the coating which prevent premature rupture of the microcapsules during normal handling prior to use of the copy paper in making a data record copy.

The stilt material should be slightly larger than the microcapsules, and should be as inexpensive as possible. Most inexpensive starch granules which have the desirable uniformity of shape are too small in average size to effectively eliminate smudging of typical microencapsulated ink coatings on carbonless copy paper. One material which has the desired uniformity of shape, and a large enough average particle size is arrowroot starch. However, arrowroot starch is both scarce and expensive, so substitute stilt materials have been developed.

DESCRIPTION OF THE PRIOR ART

Useful stilt materials have been obtained from granular starches having bimodal particle distribution, such as wheat, by separation techniques in which the larger granules are separated from the smaller granules, and the larger granule portion of the separated material, therefore, closely resembles arrowroot in average particle size, however, the smaller granule portion of the bimodal starch is not utilized as a stilt material. Such stilt materials are described in U.S. Pat. No. 3,901,725 issued Aug. 26, 1975. Other refinements to such stilt materials are described, including a special cross-linking process under highly alkaline conditions, in U.S. Pat. No. 3,876,629 issued Apr. 8, 1975. This latter patent describes crosslinking of the physically separated, large granule starch particles, but makes no disclosure of a granule swelling method to increase the overall size of the starch granules and therefore, the overall number of granules which may be used as a protective stilt material.

In the typical treatment of granular starch, care is taken to avoid swelling of the granules. For example, U.S. Pat. No. 2,500,950 describes in detail how swelling (and gelatinization) of starch granules may be prevented or "inhibited" by crosslinking the starch. Crosslinking agents such as epichlorohydrin were used. The object of the crosslinking is to improve the noncohesive properties of cooked pastes made with starch, and emphasis is placed on inhibiting the starch granules to make them resistant to alkali for the purpose of producing a noncohesive, salve-like paste when subjected to normal gelatinizing conditions.

U.S. Pat. No. 2,626,257 is directed to an alkaline crosslinking reaction of corn starch employing glycerol dichlorohydrin, epichlorohydrin, or other crosslinking agents to make a nonswelling, insoluble medical dusting powder. The product must be sufficiently resistant to swelling to withstand high temperatures when the dusting powder is used as a lubricant on surgeon's gloves which are subjected to sterilization.

Crosslinking was used in U.S. Pat. No. 3,014,901 for the primary purpose of preventing the starch granules from swelling in cold water when reacted in an aqueous slurry with a reagent such as ethylene oxide to make a modified granular starch having thereon substituent groups, such as hydroxyethyl, for use as a textile size. The substitution reaction has the effect of again decreasing the gelatinization temperature of the starch, but not to the extent that it is cold-water-soluble. The final gelatinizing temperature ranged from 45° C.–95° C. (113° F.–203° F.). Although swelling of the inhibited granules to a "moderate extent" is described (Specification, column 3, lines 61–63). The amount of swelling is not disclosed, and the uses disclosed for the product do not contemplate an intact, granular starch (Column 4, lines 68–70), but require that it be gelatinized.

A more recent U.S. Pat. No. 3,607,396, discloses a process for manufacture of a granular preswollen starch, and discusses the general concepts of birefringence and its effect on solubility (Specification, column 1, lines 18–30). The main object of this patent is to obtain a "granular", cold-water-swelling starch by a solvent treating process. The product has been subjected to heat, and has lost its birefringence without losing its "granular" structure so that it is conveniently handled. However, because the product is cold-water-soluble, it is unsuitable for use as a stilt material. The "granules" are intended to dissolve in the presence of moisture. Although crosslinking is mentioned, it is only for the purpose of keeping the more delicate types of starch granules intact while heating them to make them cold-water-soluble. A cold-water-soluble granule is unsuitable for use as a stilt material in any aqueous paper coating process for making carbonless copy paper. In addition, a drying process employing elevated temperatures would also disrupt such "granules", thereby defeating the purpose for which they are included in the paper coating, that is, to protect the ink microcapsules from premature rupture during handling of the finished copy paper.

Most of the prior art known to applicant describes the swelling phenomena, and ways to avoid swelling if that is the goal. U.S. Pat. No. 3,632,803 employs swelling inhibitors. A gelatinization inhibitor is described in U.S. Pat. No. 2,876,217, and U.S. Pat. Nos. 2,858,305; 2,977,356 and 3,014,901 are all directed to methods for minimizing or avoiding swelling of the starch granules.

U.S. Pat. No. 2,825,727 mentions wheat starch, but this patent is directed toward lowering pasting temperature to make the product more soluble. The use of calcium hydroxide catalyst is disclosed in U.S. Pat. No. 2,801,241, and the specification mentions that the starch swells under such conditions, but no practical value for the observed swelling is disclosed, nor is there any disclosure that swollen birefringent granules can thereafter be stabilized at their enlarged size by means of crosslinking.

SUMMARY OF THE INVENTION

This invention is directed to an enlarged granular starch material obtained from smaller size starch granules which are first caused to enlarge without a complete loss of birefringence, and are then treated to retain the enlarged intact discrete granular structure through subsequent coating and processing operations. Enlargement of average granule size may be as much as 25–35% without loss of birefringence. At present, the initial controlled swelling of the granules is obtained by treating an aqueous slurry of the undersized granules with an alkali such as sodium hydroxide at a level of alkalinity and for a time sufficient to swell the granules without loss of birefringence.

When a bimodal starch such as wheat is being treated, it can be obtained from wheat flour "second clears" without drying, or a previously dried wheat starch can be used. The bimodal wheat starch can be subjected to a single-pass through a hydrocyclone of the type described in U.S. Pat. No. 3,901,725 to separate out only the smallest granule portion so that the average subsieve particle size of the starch granules to be alkali treated is at least about 12.5 microns. After the single-pass hydrocyclone separation, the underflow stream contains the slightly larger granule portion and comprises about half of the original weight of the starch. This underflow stream is treated with sodium hypochlorite to oxidize the granules slightly and enhance the alkali-swelling. The usual alkali treatment period is about two hours. Care must be taken throughout the treatment of the starch granules to preserve granule birefringence and retain cold water insolubility of the granules.

The swollen granules are then strengthened against dissolution or fragmentation by crosslinking them with a polyfunctional crosslinking agent such as phosphorus oxychloride, epichlorohydrin, sodium hexametaphosphate or urea formaldehyde. The crosslinked granules are resistant to heat, and can be slurried in water during the copy paper coating process without dissolving. The enlarged granules are sufficiently large to provide effective protection to ink microcapsules during handling of coated carbon copy paper.

Undersized starch granules can be enlarged and made into effective stilt materials by the process here described, thereby substantially increasing the proportion of usable granules in a starch having bimodal granule size distribution. The smallest granules of wheat starch are difficult to swell sufficiently without loss of birefringence to attain a particle size which is useful as a typical stilt material, in which the average subsieve particle size should be more than 14 microns, and preferably, at least about 14.5 microns. As presently practiced, by combining the single-step hydrocyclone separation, the alkali-swelling and crosslinking, approximately 50% by weight of the starch in a prime grade wheat starch can be utilized as stilt materials by using the process of the subject invention.

DETAILED DESCRIPTION

FIG. 1 of the drawings is a photomicrograph enlarged to 400× showing a typical native wheat starch slurry having bimodal granule distribution;

FIG. 2 of the drawings is a photomicrograph enlarged to 400× showing the slurry of slightly larger granules collected from the first-pass underflow of a hydrocyclone separation of the typical wheat starch slurry shown in FIG. 1;

EXAMPLE I

Figure 1:
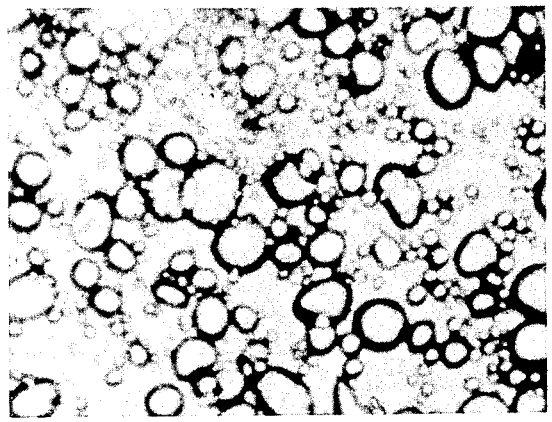
Figure 2:
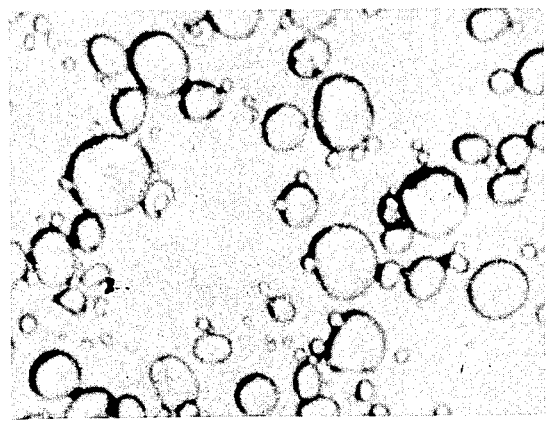
Figure 3:
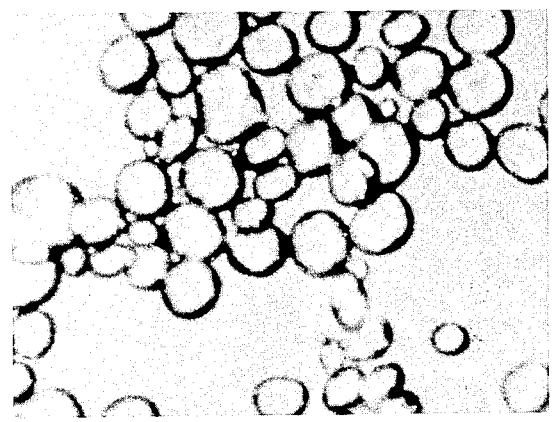
FIG. 3 is a photomicrograph enlarged to 400× of one embodiment of the alkali-swollen starch granules of the invention obtained from the slightly larger granules of FIG. 2 which have been slightly crosslinked to preserve the enlarged granular structure.
Figure 4:
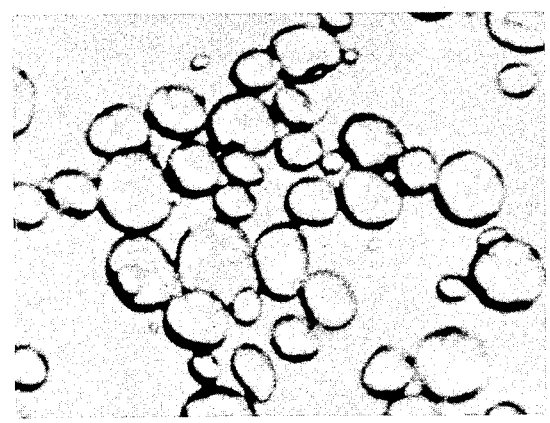
FIG. 4 is a photomicrograph enlarged to 400× of a second embodiment of the alkali-swollen starch granules of the invention, also obtained from the slightly larger granules of FIG. 2, but which have been more heavily crosslinked to preserve the enlarged granule structure even under higher coating temperatures.
Figure 5:
FIG. 5 is a photomicrograph enlarged to 400× of the product of FIG. 3 under polarized light showing marked birefringence of the alkali-swollen, slightly crosslinked starch granules.
Figure 6:
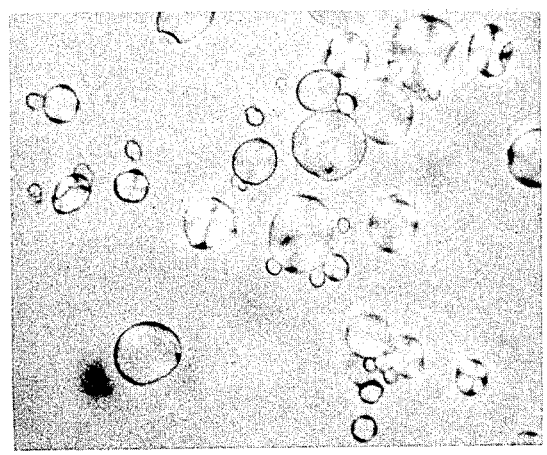
FIG. 6 is a photomicrograph enlarged to 400× of the product of FIG. 4 under polarized light showing good birefringence of the alkali-swollen, more highly crosslinked starch granules.

A slurry of wheat starch was cooled to 70°–74° F. (21.1°–23.3° C.), and the pH was adjusted to 4. The slurry was then treated by adding dilute sodium hydroxide (4.5° Bé) until the titer was 13.3 ml. An alkaline titer procedure was used in all examples which employed 0.1NHCl added dropwise to a 10 ml starch slurry sample containing phenolphthalein until the sample reaches the phenolphthalein end point (solution changes from red to clear), as described in U.S. Pat. No. 3,876,629 issued Apr. 8, 1975. The temperature increased during this addition to about 80° F. (26.7° C.). The above addition of sodium hydroxide caused the starch granules to swell without losing their birefringence. After one hour of the above treatment, 0.36% by weight phosphorus oxychloride based on the weight of the starch was added to crosslink the enlarged granules. The addition of phosphorus oxychloride caused the titer to drop to about 9.8–10.0 ml. A sample of the swollen granules showed an average subsieve particle size above about 13 microns, compared to an initial subsieve value of about 11 microns for the original prime grade starch. The Kofler hot stage pasting temperature for this product was about 122°–125.6° F. (50°–52° C.). When observed microscopically, the granules appeared to have retained their shape and integrity, but were larger and rounder, and exhibited birefringence under polarized light. The product was used as a stilt material for carbonless copy paper, and provided acceptable smudge (friction staining) values above about 80 and typewriter intensity values below about 55.

EXAMPLE II

Starch granules were treated as above, but the crosslinking reaction was continued until the Kofler hot stage pasting temperature was higher than 158° F. (70° C.). This product was used as a stilt material for carbonless copy paper in a coating process in which high paper coating temperatures are required. The resulting copy paper had acceptable smudge values (friction staining) above about 80, and typewriter intensity values below about 55.

EXAMPLE III

As observed in the above examples, the alkali-swelling technique was capable of increasing average granule size by about 12–15%. It was determined that an even greater increase in average granule size could be obtained by first partially separating the smaller granules from the larger granules in a bimodal wheat starch. This was done by means of subjecting the bimodal wheat starch granules in slurry to a single-pass flow through a hydrocyclone separator of the type described in U.S. Pat. No. 3,901,725. The underflow from the hydrocyclone was collected, and had an average particle size of about 12-19% greater than the initial starch, measured by subsieve analysis following the detailed procedure set forth below. These granules were then subjected to the process of Example I, and produced a product having an average subsieve increase of 25-28% over the original slurry.

These starch granules have been used as stilt materials in carbonless copy paper coating, and have been found to be completely acceptable as a replacement for other previously used stilt materials such as arrowroot starch granules and the type of large starch granules obtained using the method of U.S. Pat. No. 3,901,725. There is a distinct advantage in yield volume employing the subject invention. About 50% of the total weight of the initial wheat starch slurry can be utilized, compared to only about 25% of the initial wheat starch slurry in the process of U.S. Pat. No. 3,901,725. The relative economies at the present time favor maximum recovery of the larger granule stilt material. The smaller granule fraction is utilized also, but the increased yield of the larger granule product by means of alkali-swelling substandard granules is a significant advantage in increasing production yield percentage over straight, two-pass hydrocyclone separation methods practiced prior to the subject invention.

EXAMPLE IV

In a typical production process, a quantity of first-pass underflow wheat starch slurry is collected from a hydrocyclone system. The hydrocyclones are type "P" Doxie Impurity Eliminators available from Dorr-Oliver, Inc., Stamford, Conn. and have the following dimensions:

| a) | diameter, cylindrical section | 1.02" |
|----|-------------------------------|-------|
| b) | height, cylindrical section | 19/32" |
| c) | diameter, feed aperture | 3/16" |
| d) | diameter, vortex finder | 21/64" |
| e) | length, vortex finder (inside) | 7/8" |
| f) | diameter, discharge aperture | 350" |
| g) | apex angle | 16° |

Typical Baumé of the feed slurry is 7.5° Bé. The feed slurry may be made from either previously dried wheat starch, or from native colloid wheat starch slurry which is substantially free of fiber and gluten and has never been dried. It is important that the slurry of starch granules be substantially free of broken or damaged granules and fragments of granules, and that the granules be effectively "nonagglomerated" after the pretreatment and before commencing the alkali-swelling. The slurry is placed in a reactor tub at about 70°-72° F. (21.1°-22.2° C.) and about 0.44% by weight based on the starch dry weight of chlorine (added as sodium hypochlorite) is added and reacted for 1.5-2 hours. This oxidation treatment is believed to "open" the granules slightly to make the granules more susceptible to the alkali-swelling. The slurry temperature is then kept below 80° F. (26.7° C.) while being agitated and 4°-5° Bé sodium hydroxide is added until 10 ml of slurry requires 13-14 ml of 0.1N HCl to titrate to a phenolphthalein end point (that is, when the titer solution just turns clear from red). Approximately 1.8% by weight NaOH (dry solids) is required, based on the dry weight of the starch. The alkali treated slurry is stirred for about a two hour reaction time, and a sample is removed and observed under a polarized light microscope. Birefringence of the granules should be present. The sample is also observed for subsieve value, using the procedure set forth below following Example V. The alkali-swelling should be continued until the subsieve value is 15.8 microns or more, but the granules should retain their birefringence. The usual time is about two hours.

Then the slurry is adjusted to a titer of 9 ml by adding phosphorus oxychloride. About 0.36% $POCl_3$ based on the weight of the dry starch is required. After the titer is adjusted to 9 ml., the slurry is allowed to react for about 0.5-1 hours. The slurry is then adjusted to 5-7 pH with concentrated sulfuric acid, about 2.3% by weight $H_2SO_4$ based on the starch dry weight is required. The slurry is then screened, filtered, washed and dried. The dried swollen starch is then ground in a Jeffrey mill, taking care to preserve the intact granules. The resulting product has an average subsieve particle size of at least 14.0 microns, and the birefringence of the granules is retained. The crosslinking insures that the granules will remain intact during normal carbonless copy paper coating applications. The slightly crosslinked granules have a Kofler hot stage pasting temperature of about 12°-18° (5°-8.3° C.) higher than the prime grade wheat starch from which they were made.

EXAMPLE V

A more highly crosslinked product can be made which has the alkali-swollen granules, obtained as set forth above, but then the granules are subjected to an additional, highly alkaline crosslinking step, similar to that described in U.S. Pat. No. 3,876,629 issued Apr. 8, 1975. Instead of adjusting the pH of slurry of slightly crosslinked granules to 5-7 as in Example IV, the slurry is then subjected to the simultaneous, but separate addition of phosphorus oxychloride and sodium hydroxide, allowing the titer to move slowly upward, according to the following table:

Table I

| Time in Minutes After Starting $POCl_3$ Addition | Approx. Bé NaOH Solution | Alkalinity Titer in ml |
|---|---|---|
| 5 | 6-8 | 10 minimum |
| 10 | 6-8 | 12-14 |
| 20 | 8-10 | 12-14 |
| 30 | 8-10 | 12-14 |
| 60 | 12-14 | 12-14 |
| 90 | 12-14 | 15-18 |
| 120 | 14-15 | 15-18 |
| 150 | 15-18 | 18-22 |
| 180 | 15-18 | 18-22 |
| 200 | 15-18 | 18-22 |

An additional amount (over Example IV) of about 6% $POCl_3$ based on the starch dry weight is required, and an additional amount of about 3.6% NaOH based on the starch dry weight is required. The last increment of $POCl_3$ is added without adding NaOH. The rate at which NaOH is added should be decreased if the titer increases more rapidly than the time schedule set forth above. The rate of NaOH addition may be increased if the titer is lower than on the above time schedule. The Baumé (concentration) of the NaOH is increased in the increments indicated as the starch granules become "conditioned" by the crosslinking.

Ten minutes after all $POCl_3$ has been added, the alkali fluidity is measured for a 20 g. dry substance starch sample slurried in 30 ml of distilled water. To this slurry 70 ml of 2N NaOH is added. The alkali fluidity should be at least 70 ml, following the procedure set forth below under "TEST PROCEDURES".

The slurry is then adjusted to pH 5.3-5.6 with concentrated H₂SO₄. About 3.5% H₂SO₄ based on the starch dry weight is required. The slurry is then screened, filtered, washed and dried to about 8-12% moisture and ground to a free-flowing powder, taking care to avoid damaging the swollen, crosslinked starch granules. The resulting swollen starch granules have an average subsieve value of at least 14.0 microns following the test procedure set forth below, and the Kofler hot stage pasting temperature has been increased about 30°-36° F. (20°-22° C.) over the original pasting temperature of the native, bimodal wheat starch. The original Kofler hot stage pasting temperature was about 122° F. (50° C.) and the pasting temperature of the enlarged alkali-swollen, heavily crosslinked wheat starch granules is at least 158° F. (70° C.). The increased resistance to heat preserves the intact granule structure of the starch particles, even when used in copy paper coating processes which employ elevated temperatures. For example, at least one coating method employs an infrared heat source to dry the coatings on the substrates, so the coating materials are subjected to much higher temperatures greatly in excess of those normally experienced. The subject crosslinked product has been used successfully in such coating processes, and provides an excellent protective stilt material coated on the copy paper to effectively prevent rupture of the ink microcapsules during normal handling. Smudge values (friction staining) for such copy paper are consistently above 80, following the test method set forth in British Patent No. 1,252,858, published Nov. 10, 1971. Typewriter impact values for the same copy paper using the protective stilt materials of the subject invention (having smudge values above 80) are below about 55, following the impact test method described in the subject British Patent Specification 1,252,858. Such papers make good copies, but are not subject to smudging during handling. The ink microcapsules are adequately protected during handling by the subject granular starch stilt particles, but the starch particles do not hinder the impact-caused rupture of particular chromogenic ink capsules when a copy is being made.

DSC pasting temperature are set forth in the table below:

Table II

| Material Tested | DSC Pasting Temperatures | | |
|---|---|---|---|
| | Start | Peak | End |
| First-pass underflow starting material | 61° C. | 68° C. | 74° C. |
| Example I and IV product | 66° C. | 71° C. | 79° C. |
| Example II and V product | 75° C. | 78° C. | 87° C. |

The procedure for obtaining the DSC pasting temperatures recorded in Table I is set forth below. It can be seen that the slightly crosslinked product has somewhat higher DSC pasting temperatures than the starting starch material, and the heavily crosslinked product has DSC pasting temperatures substantially higher than the starting starch material.

TEST PROCEDURES

Kofler Hot Stage Pasting Temperature

The Kofler hot stage pasting temperature is determined according to the method generally described in the following publication: Schoch, et al. *Microscopic Examination of Modified Starches*, Analytical Chemistry 28: 382-387 (1956). In this method, a Kofler electrically heated microscope stage is used to heat a drop of an 0.1-0.2% suspension of the starch on a microscope slide. The heating rate is adjusted to about 2° C. per minute, and the granules are observed during the heating with normal and with polarized light. Using normal light, the pasting of a granule can be noted by the change in shape and size as it begins to swell. The loss of birefringence evidenced by the loss of the polarization cross is observed with polarized light. The granules paste over a range of temperature, and the temperature at the instant when 50% of the granules in the field of the microscope are estimated to have lost their polarization crosses is recorded, and is defined as the pasting temperature for purposes of this test.

Alkali Fluidity

To conduct the alkali fluidity test, the alkaline starch suspension is placed in the fluidity funnel and the amount of starch solution which flows through the funnel during the water-time is measured and recorded in milliliters. The funnel is thoroughly washed prior to each test to insure accurate observations.

The alkali fluidity test is presently believed to be the most practical means for controlling the degree of crosslinking of the starch. The test is generally described in U.S. Pat. No. 3,238,193 at columns 7 and 8, lines 40-61 and 1-9 respectively. The basic principle followed is to compare the fluidity of the sample to the fluidity of water as a standard. There are, of course, variations in the particular starch sample concentrations, and only samples of the same starch concentration can be directly compared to each other. For example, if a starch sample is quite thick when pasted, a smaller amount will be used in proportion to the amount of water it is mixed with so that a middle or higher than middle range figure will be obtained (50 ml. or more, up to about 90 ml.).

The fluidity funnel used for the alkali fluidity tests described herein comprises two main parts, a funnel body and a funnel tip threadably attached thereto. A simple plunger-type, tapered valve on a glass stem can be used to manually control flow through the funnel orifice. The funnel parts are precision-machined from stainless steel stock, and polished to very smooth surfaces on all parts which come in contact with the test samples.

The funnel body defines a generally cone-shaped vessel having a sixty degree angle (or taper) between opposite, converging funnel walls. Funnel body height is sufficient to hold at least a 100 ml. sample, and a 0.277 inch orifice and fluid passage is provided at the narrowest portion of the funnel for attachment to the funnel tip. The fluid passage is 1½ inches in length from the orifice to the narrow end of the funnel body. The opposite, wide orifice of the funnel body is oriented upwardly, and the tapered valve is inserted downwardly from above into the smaller orifice during the tests. Operation of this valve against the water-time of the funnel gives the test readings. The funnel tip is a cup-shaped member, which is threadably received on the narrow end of the funnel body. The internal chamber of the funnel tip is hemispherical and has a 3/16 inch diameter with a lower central opening of 0.070 inch which is 0.0492 inches in length. The total height for the lower end of the funnel body passage to the lower external orifice of the funnel tip includes the height of the ball chamber (0.1008 inches) and the length (0.0492 inches) of the funnel tip opening.

For purposes of the alkali fluidity test employed here, the slurry sample to be tested is prepared as follows:

Slurry 20 g d.s. starch in 30 ml. distilled water in a fluidity beaker. Add 70 ml. 2ON NaOH solution, stir 3 minutes with a fluidity stirrer and immediately measure fluidity with a previously standardized fluidity funnel.

Following the above test procedure, the heavily crosslinked product of Examples II and V should have an alkali fluidity value of at least 70 ml.

DSC Pasting Temperature

The gelatinization of starch is an endothermic reaction. An empty sealed pan is compared to the starch sample in an identical pan as they are heated at a uniform rate in a Differential Scanning Colorimeter (DSC). The energy differential required to keep the two samples at the same temperature is recorded. The temperatures at which the starch sample endotherm begins, peaks and ends are the DSC pasting temperatures of the starch.

The apparatus employed includes a Perkin-Elmer, Model DSC-1 Differential Scanning Colorimeter having a 273–773K range-span plug-in, equipped for nitrogen purging. The apparatus and accessories are available from Perkin-Elmer Corporation, Norwalk, Connecticut, and include volatile sample pans and sealer (Catalogue No. 219-0061) regular sample pans (Catalogue No. 219-0041), and a regular sample pan crimper. A Cahn Electrobalance, Model G, available from Cahn Instrument Inc., Paramount, California is also used in the procedure. Melting point standard include p-nitrotoluene, naphthalene and benzoic acid available from A. H. Thomas Company, Philadelphia, Pa. (Catalogue No. 6431-H15).

The DSC is first calibrated using standard samples of p-nitrotoluene, benzoic acid, and naphthalene following the instructions provided with the equipment using 20°/minute scan speed and 2 range. A calibration graph is made by plotting the melting points obtained from the above samples in K against the melting points in ° C. given on the containers of the standard samples.

After calibration has been completed, the test proceeds as follows: About 3 mg of starch to be tested is placed in a volatile sample pan. Ten microliters of water is added, and mixed with a needle, so that all the starch is wet by the water, and the pan is sealed. The sample to be tested is placed in the right side of the sample holder assembly, and an empty pan and lid are placed in the other (left) side. The sample holder assembly cover is placed thereon. The scan speed is set at 20°/minute, and the range is set at 2. The recorder is started, and the baseline is brought to the left side of the chart with zero control. Scanning is about 20K past the gelatinization endotherm of the starch.

The temperature in K at which the endotherm started is read, and converted to corrected ° C. from the calibration graph. The resulting value is the DSC pasting temperature, at start (in ° C.). The recorded temperature in K of the endotherm peak is read, and converted to corrected ° C. from the calibration graph. This is the DSC pasting temperature, peak. The temperature at which the endotherm ended is then read in K and converted to corrected ° C. from the calibration chart. This value is the DSC pasting temperature, end.

Subsieve Test

The equipment used to obtain the above subsieve values was a Fisher Model 95 Subsieve Sizer, available from Fisher Scientific Co., Inc. Instrument Division, Pittsburgh, Pa. When operated according to the instructions supplied, this instrument provides quick and reproducible measurements of average particle sizes in the 0.2 to 50 micron range (Fisher Instruction Manual, Instrument Division, Catalog No. 14-311). Each measurement is read directly from the curve on the Calculator Chart located at the top half of the instrument.

Air permeability to a regulated air flow is measured by a manometer and converted to average particle size, based on the principle that air flows more readily through a bed of coarse powder under standard packing conditions than through an otherwise equal bed of fine powder that is equal in shape of bed, apparent volume, percentage of voids and packed under the same conditions. Measurements of average particle size are obtained by reason of difference in general coarseness of material, that is, differences in average pore diameter and total interstitial surface. Although based on complex formulas, the standardization of conditions by Ernest L. Gooden and Charles M. Smith have made it possible to obtain a direct reading of average particle size of a sample from the instrument without mathematical computation. See: Gooden, E. L. & Smith, Charles M., *Industrial Engineering Chemistry Analytical Edition* 12:479–482 (1940).

The following special steps have been added to the above procedure, and tend to depress the overall average subsieve values obtained as compared to those obtained and recorded in U.S. Pat. No. 3,901,725. However, these steps are now considered important, and are included in the subsieve testing procedure:

(1) the instrument is energized and allowed to warm up for a full ten minutes before any tests are commenced.
(2) bubbles start to rise in the standpipe after about 30 seconds. The pressure control knob is adjusted so that there are 2 to 3 bubbles per second;
(3) chart alignment is now carried out on both sides to allow for error;
(4) exactly 1,530g is used in weighed samples and a balance is used which is accurate to the thousandths of a gram (milligram);
(5) care is taken to align the test tube correctly and to be sure that the lower plug does not rest on the base of the post;
(6) a torque wrench is now used to uniformly compact the starch;
(7) a magnifier is used for more precise measuring.

SUMMARY

The combination of partial wet process sizing of a bimodal starch with the new alkali-swelling technique here disclosed produces a new, less costly protective stilt material for carbonless copy paper and other microcapsule coatings. The yield of usable stilt material from a given amount of prime grade bimodal wheat starch is increased substantially, thereby adding substantial value to the wheat starch. The alkali-swelling is closely controlled so that the enlarged granules do not lose their birefringence, but their overall size is increased by about at least 10% in average subsieve value, and at least 3 microns over the subsieve value for prime grade wheat starch.

The slight to heavy crosslinking further stabilizes the swollen granules so that they remain on the coated paper surface as discrete, protective stilt particles during the coating process, even when subjected to higher temperatures up to about 160° F. The swollen granules remain intact even in slurry.

The delicate combination of alkali-swelling to increase the average granule size while preserving birefringence of the granules, and thereafter crosslinking the enlarged granules to strengthen them to preserve them at their enlarged size through subsequent copy paper coating steps has substantially increased the yield potential for starch stilt materials. Many granular starches which are slightly undersized now can be made into useful stilt materials. It is believed that any starch having an average granule subsieve size of about 11.0 microns can be swollen and crosslinked to produce a protective stilt material having an average subsieve value of at least 14 microns. Under certain carefully controlled conditions, an average subsieve value of 17 microns can be achieved.

Since many embodiments of this invention may be made and since many changes may be made in the embodiments described, the foregoing is interpreted as illustrative and the invention is defined by the claims appended hereafter.

We claim:

1. An enlarged granular starch material comprising substantially intact starch granules which are at least about 7–50% larger than the original intact starch granules, said granules having been enlarged without a complete loss of birefringence, and being crosslinked with a polyfunctional crosslinking agent to stabilize the enlarged granules against disintegration when exposed to an aqueous medium and to slightly elevated temperatures which would otherwise gelatinize the uncrosslinked enlarged intact starch granules.

2. The granular material of claim 1, in which the starch granules have been enlarged by exposing the original granules to an alkali medium for a time sufficient to obtain swelling without a complete loss of birefringence, and thereafter crosslinking to obtain enlarged intact starch granules having an increase in average subsieve value of at least about 1.5 microns.

3. The granular starch material of claim 1, in which the granules have a final average subsieve value of about 5 microns more than the initial average subsieve value prior to swelling in alkali.

4. The granular starch material of claim 1, in which the starch is a bimodal starch selected from the group consisting of wheat, barley and rye, and has been subjected to at least one wet process separation step to increase the average subsieve value of the retained intact starch granules which are then treated with alkali and crosslinking to obtain intact starch granules which are further enlarged.

5. The granular starch material of claim 4, in which the wet processing step comprises passing the bimodal starch in aqueous slurry through a single-pass hydrocyclone, then alkali-swelling the resulting underpass slurry of partially size classified intact starch granules having an average particle size of about 12.5 microns, and thereafter crosslinking said swollen granules to obtain enlarged intact, alkali treated and crosslinked starch granules which have an average subsieve particle size value of at least about 14 microns.

6. The granular starch material of claim 5, in which the alkali treated and crosslinked starch granules have an average particle size of at least about 15 microns.

7. The granular starch material of claim 6, in which the alkali-swelling is conducted at a temperature of at least about 90° F.

8. The granular starch material of claim 7, in which the alkali-swelling is conducted at a temperature in the range of about 90° F. up to just below the temperature at which the granules lose birefringence when observed under a polarized light microscope.

9. The granular starch material of claim 8, in which the upper end of the temperature range at which the alkali-swelling is conducted is about 95° F.

10. The protective stilt material of claim 4, in which the final average subsieve value is at least about 14 microns.

11. The protective stilt material of claim 4, in which the original starch material is wheat starch having an initial average subsieve value of about 11 microns, said original starch material having been first subjected to wet process size classification to obtain an intermediate, larger granule starch having an average subsieve value of about 12.5 microns, said intermediate, larger granule starch material having then been subjected to alkali-swelling at conditions of pH and temperature under which birefringence of the swollen starch granules is retained while increasing the average subsieve value of the swollen starch granules to about 17 microns, and thereafter crosslinking said swollen starch granules to stabilize the granules against premature disintegration while being applied to a substrate, and when exposed to water.

12. A swollen, granular starch material comprising substantially intact starch granules which are at least about 40–70% larger than the original intact starch granules prior to swelling, said granules exhibiting birefringence are being crosslinked with a polyfunctional crosslinking agent to resist disintegration, and said granules having been subjected to fluid entrainment drying with heat, thereby obtaining at least part of the total increase in granule size from the fluid entrainment drying.

13. The granular starch material of claim 12, in which the fluid entrainment drying is flash drying, and the granules are thereby caused to increase in size by about 12% over the average granule size just prior to drying.

14. The granular starch material of claim 12, in which the initial average subsieve particle size is about 11 microns, and the final average subsieve particle size is at least 16 microns.

15. The granular starch material of claim 12, in which the original starch granules comprise bimodal starch selected from the group consisting of wheat, barley and rye, and said original starch granules having been subjected to at least one wet process separation to increase the average subsieve value of the retained intact starch granules, which are then subjected to alkali-swelling to further increase starch granule size, and finally, to flash drying to obtain even further increase of starch granule size.

16. The granular starch material of claim 15, in which the average subsieve value of the original starch granules is about 11 microns, the average subsieve value of the retained starch granules is about 12.5 microns, the average subsieve value of the retained starch granules after alkali-swelling is at least about 14 microns, and the final average subsieve value of the starch granules after flash drying is at least about 16 microns.

17. The granular starch material of claim 16, in which the alkali-swelling is conducted at a temperature of at least about 90° F., and the air temperature in the flash dryer is in the range of 190–325° F.

18. The granular starch material of claim 17, in which the starch granules have been crosslinked with a polyfunctional crosslinking agent selected from the group consisting of epichlorohydrin, urea-formaldehyde, phosphorus oxychloride and sodium trimetaphosphate to increase the Kofler hot stage pasting temperature to a temperature above that attained by the starch granules in the flash dryer.

19. The granular starch material of claim 12, derived from a bimodal wheat starch having an average subsieve particle size of about 11 microns, which has been subjected to a single-pass hydrocyclone to produce size classified wheat starch granules having an average subsieve particle size of about 12.5 microns, said size classified wheat starch granules having thereafter been subjected to swelling in the presence of NaOH, and thereafter crosslinked to obtain a treated granular starch material having an average subsieve particle size of at least about 14 microns, and thereafter subjecting said treated granular starch material to flash drying to obtain a swollen, crosslinked granular starch material exhibiting birefringence, and having an average subsieve particle size of at least about 16 microns.

20. The method of making granular starch material consisting essentially of intact, enlarged starch granules, the steps comprising:
(a) forming a slurry of a granular starch;
(b) adding acid to lower the pH of the slurry to less than about 5:
(c) adding dilute alkali until the pH reaches about 11-12;
(d) allowing the alkali to swell the starch granules in the slurry while maintaining the temperature in the range of 90-95° F. and pH of the slurry above 11;
(e) thereafter adding a polyfunctional crosslinking agent selected from the group consisting of epichlorohydrin, urea-formaldehyde, sodium trimetaphosphate and phosphorus oxychloride to said alkaline slurry in an amount sufficient to increase the pasting temperature of the enlarged starch granules above the original pasting temperature of the granular starch; and
(f) drying said swollen starch granules to obtain an enlarged granule starch material in which the average particle size of the granules is about 7-50% larger than the original granular starch.

21. The method of claim 20, in which the granular starch is a bimodal starch selected from the group consisting of wheat, barley and rye, and including the step of subjecting the granular starch to at least one wet process separation step to increase the average subsieve value of the retained intact starch granules to an intermediate subsieve value higher than the initial value and thereafter subjecting the retained intact starch granules to swelling in alkali to further increase the average subsieve value of the starch granules.

22. The method of claim 21, in which the wet processing step comprises passing the bimodal starch in aqueous slurry through a single-pass hydrocyclone, and retaining the underflow granular starch from said hydrocyclone for further treatment with alkali.

23. The method of claim 22, in which the alkali is sodium hydroxide.

24. The method of claim 21, in which the initial subsieve value of the granular starch is no more than about 11 microns, the intermediate subsieve value is at least 12.5 microns after wet process separation, and the final average subsieve value after alkali-swelling is at least 14 microns.

25. The method of claim 21, in which the swollen starch granules are flash dried.

26. The method of claim 21, in which the temperature during alkali-swelling of the starch granules is maintained at least at about 90° F.

27. The method of claim 21, in which the temperature of the aqueous slurry of starch granules during alkali-swelling is maintained in the range of about 90-95° F.

28. The method of claim 20, in which the swollen starch granules are flash dried at flash dryer temperatures in the range of 190°-325° F. to further swell the starch granules without loss of birefringence.

* * * * *